US009205392B2

(12) United States Patent
Byl et al.

(10) Patent No.: US 9,205,392 B2
(45) Date of Patent: Dec. 8, 2015

(54) APPARATUS AND METHOD FOR PREPARATION OF COMPOUNDS OR INTERMEDIATES THEREOF FROM A SOLID MATERIAL, AND USING SUCH COMPOUNDS AND INTERMEDIATES

(75) Inventors: Oleg Byl, Southbury, CT (US); Edward E. Jones, Woodbury, CT (US); Chiranjeevi Pydi, Danbury, CT (US); Joseph D. Sweeney, Winsted, CT (US)

(73) Assignee: ENTEGRIS, INC., Billerica, MA (US)

( * ) Notice: Subject to any disclaimer, the term of this patent is extended or adjusted under 35 U.S.C. 154(b) by 648 days.

(21) Appl. No.: 13/219,706

(22) Filed: Aug. 28, 2011

(65) Prior Publication Data
US 2012/0051994 A1   Mar. 1, 2012

Related U.S. Application Data

(60) Provisional application No. 61/378,375, filed on Aug. 30, 2010.

(51) Int. Cl.
| | | |
|---|---|---|
| B01J 19/00 | (2006.01) | |
| B01J 8/02 | (2006.01) | |

(Continued)

(52) U.S. Cl.
CPC .............. B01J 8/0465 (2013.01); B01J 8/0285 (2013.01); C01B 35/061 (2013.01);
(Continued)

(58) Field of Classification Search
CPC .......... A61L 2/00; A61L 2/24; B01J 19/0093; B01J 8/0285; B01J 2/00; B01J 8/00; B01J 8/02; B01J 8/04; B01J 8/0446; B01J 8/0461; B01J 85/0465; B01J 2008/00; B01J 2008/00008; B01J 2008/00017; B01J 2008/00389; B01J 2008/00433; B01J 2008/00539; B01D 1/00; B01D 23/00; C01B 35/06; C01B 25/06; C01B 7/00; C01B 37/00; C01B 35/00; C01B 35/02; C01B 35/023; C01B 35/061
USPC .......... 422/105, 129, 198; 423/276, 289, 292, 423/293
See application file for complete search history.

(56) References Cited

U.S. PATENT DOCUMENTS

| | | | |
|---|---|---|---|
| 4,657,774 A | 4/1987 | Satou et al. | |
| 4,680,358 A | 7/1987 | Yu | |

(Continued)

FOREIGN PATENT DOCUMENTS

| | | |
|---|---|---|
| CN | 101384747 A | 3/2009 |
| EP | 0079705 A1 | 5/1983 |

(Continued)

OTHER PUBLICATIONS

Timms, Boron-Fluorine Chemistry. I. Boron Monofluoride and Some Derivatives, Mar. 29, 1967, Journal of the American Chemical Society, 89:7, 1629-1632.*

(Continued)

Primary Examiner — Natasha Young
(74) Attorney, Agent, or Firm — Hultquist, PLLC; Steven J. Hultquist; Rosa Yaghmour

(57) ABSTRACT

An apparatus is described, as including a reaction region for contacting a reactant gas with a reactive solid under conditions effective to form an intermediate product, and an opening for allowing an unreacted portion of the gaseous reagent and the intermediate product to exit the reaction region. The apparatus can be beneficially employed to form a final product as a reaction product of the intermediate product and the reactant gas. The reaction of the reactant gas and reactive solid can be conducted in a first reaction zone, with the reaction of the reactant gas and intermediate product conducted in a second reaction zone. In a specific implementation, the reaction of the reactant gas and intermediate product is reversible, and the reactant gas and intermediate product are flowed to the second reaction zone at a controlled rate or in a controlled manner, to suppress back reaction forming the reactive solid.

23 Claims, 6 Drawing Sheets

(51) Int. Cl.

| | |
|---|---|
| *B01J 8/04* | (2006.01) |
| *C01B 35/06* | (2006.01) |
| *B01J 8/00* | (2006.01) |
| *C01B 35/00* | (2006.01) |
| *C01B 35/02* | (2006.01) |

(52) U.S. Cl.
 CPC ........... *B01J 2208/00017* (2013.01); *B01J 2208/00389* (2013.01); *B01J 2208/00433* (2013.01); *B01J 2208/00539* (2013.01)

(56) References Cited

U.S. PATENT DOCUMENTS

| | | |
|---|---|---|
| 4,722,978 A | 2/1988 | Yu |
| 4,803,292 A | 2/1989 | Ohfune et al. |
| 4,851,255 A | 7/1989 | Lagendijk et al. |
| 4,942,246 A | 7/1990 | Tanaka et al. |
| 5,061,322 A | 10/1991 | Asano |
| 5,443,732 A | 8/1995 | Lahoda et al. |
| 5,935,283 A * | 8/1999 | Sweeney et al. .......... 55/431 |
| 5,935,293 A | 8/1999 | Detering et al. |
| 5,977,552 A | 11/1999 | Foad |
| 5,993,766 A | 11/1999 | Tom et al. |
| 6,086,837 A | 7/2000 | Cowan et al. |
| 6,096,467 A | 8/2000 | Shimizu et al. |
| 6,135,128 A | 10/2000 | Graf et al. |
| 6,376,664 B1 | 4/2002 | Chan et al. |
| 6,420,304 B1 | 7/2002 | Tsai et al. |
| 6,452,338 B1 | 9/2002 | Horsky |
| 6,486,227 B2 | 11/2002 | Nohr et al. |
| 6,600,092 B2 | 7/2003 | Lee |
| 6,730,568 B2 | 5/2004 | Sohn |
| 6,780,896 B2 | 8/2004 | MacDonald et al. |
| 6,852,610 B2 | 2/2005 | Noda |
| 6,872,639 B2 | 3/2005 | DeBoer et al. |
| 6,893,907 B2 | 5/2005 | Maydan et al. |
| 6,905,947 B2 | 6/2005 | Goldberg |
| 7,094,670 B2 | 8/2006 | Collins et al. |
| 7,138,768 B2 | 11/2006 | Maciejowski et al. |
| 7,144,809 B2 | 12/2006 | Elers et al. |
| 7,397,048 B2 | 7/2008 | Singh et al. |
| 7,473,606 B2 | 1/2009 | Hsiao et al. |
| 7,641,879 B2 | 1/2010 | Spielvogel et al. |
| 7,666,770 B2 | 2/2010 | Sasaki et al. |
| 7,759,657 B2 | 7/2010 | Tieger et al. |
| 7,825,016 B2 | 11/2010 | Giles |
| 7,833,886 B2 | 11/2010 | Giles et al. |
| 2002/0085446 A1 | 7/2002 | Van Den Brink et al. |
| 2002/0130278 A1 | 9/2002 | Vella |
| 2003/0056720 A1 | 3/2003 | Dauelsberg et al. |
| 2003/0203608 A1 | 10/2003 | Deboer et al. |
| 2003/0216014 A1 | 11/2003 | Goldberg |
| 2004/0002202 A1 | 1/2004 | Horsky et al. |
| 2004/0110351 A1 | 6/2004 | Narasimha |
| 2004/0166612 A1 | 8/2004 | Maydan et al. |
| 2005/0035284 A1 | 2/2005 | Schultz et al. |
| 2005/0051096 A1 | 3/2005 | Horsky et al. |
| 2005/0163693 A1* | 7/2005 | Spielvogel et al. ........... 423/294 |
| 2005/0169827 A1 | 8/2005 | Spielvogel et al. |
| 2005/0176832 A1 | 8/2005 | Tonkovich et al. |
| 2005/0202657 A1 | 9/2005 | Borland et al. |
| 2006/0102464 A1 | 5/2006 | Tillotson |
| 2006/0104851 A1 | 5/2006 | Tillotson |
| 2006/0264051 A1 | 11/2006 | Thibaut |
| 2007/0059848 A1 | 3/2007 | Sasaki et al. |
| 2007/0178679 A1 | 8/2007 | Hatem et al. |
| 2008/0149929 A1 | 6/2008 | Giles |
| 2008/0248636 A1* | 10/2008 | Olander et al. ............ 438/515 |
| 2009/0294698 A1 | 12/2009 | Ray |
| 2010/0112795 A1 | 5/2010 | Kaim et al. |
| 2010/0255198 A1 | 10/2010 | Cleary et al. |
| 2010/0266087 A1* | 10/2010 | Ahlfeld et al. ............ 376/210 |
| 2011/0065268 A1 | 3/2011 | Olander et al. |
| 2011/0159671 A1 | 6/2011 | Kaim et al. |
| 2011/0212330 A1 | 9/2011 | Schrumpf et al. |

FOREIGN PATENT DOCUMENTS

| | | |
|---|---|---|
| EP | 0385709 B1 | 5/1995 |
| EP | 0656668 B1 | 3/1999 |
| JP | 58-008071 A | 1/1983 |
| JP | 63-015228 A | 1/1988 |
| JP | 6438700 A | 2/1989 |
| JP | 64-083147 A | 3/1989 |
| JP | 01-225117 A | 9/1989 |
| JP | 05-254808 A | 10/1993 |
| JP | 06-080681 A | 3/1994 |
| JP | 07-090201 A | 4/1995 |
| JP | 7299304 A | 11/1995 |
| JP | 10-251592 A | 9/1998 |
| JP | 2002-343882 A | 11/2002 |
| WO | 9811764 A1 | 3/1998 |
| WO | 03057667 A2 | 7/2003 |
| WO | 03100806 A1 | 12/2003 |
| WO | 2004053945 A2 | 6/2004 |
| WO | 2005027208 A1 | 3/2005 |
| WO | 2006095086 A2 | 9/2006 |
| WO | 2007027798 A2 | 3/2007 |
| WO | WO 2007/027798 A2 * | 3/2007 |
| WO | 2007056249 A1 | 5/2007 |
| WO | 2011056515 A2 | 5/2011 |

OTHER PUBLICATIONS

Kirk, R., "Dissertation on Synthetic Chemistry of Several HighTemperature Boron Containing Species", 1969, pp. 1-118.*
Begak et al., Boron isotopic exchange in heterogeneous system boron-boron fluoride, 1988, Radiokhimiya, v. 30(2), p. 234-237.*
Becher, H., et al., "Vibrational Spectra of Normal, Boron-10-Enriched, and Deuteriomethylboron Difuoride", "Spectrochimica Acta Part A: Molecular Spectroscopy", Oct. 1976, pp. 141-146, vol. 34, No. 2 (English Abstract).
Weast, R. (Ed.), "Physical Constants of Inorganic Compounds—Boric Acid", "Handbook of Chemistry and Physics, 56th Edition", Sep. 1975, pp. B-78, Publisher: CRC Press, Inc.
Weast, R. (Ed.), "Vapor Pressure Inorganic Compounds", "Handbook of Chemistry and Physics, 56 Ed.", Sep. 1975, pp. D-183-D-188, Publisher: CRC Press, Inc.
Yu, J., et al., "Isotopically Enriched 10BN Nanotubes", "Advanced Materials", Jul. 2006, pp. 2157-2160, vol. 18.
Kirk, R., "Dissertation of Synthetic Chemistry of Several High Temperature Boron Containing Species", 1969, pp. 1-118.
Kirk, R., et al., "Boron-Fluorine Chemistry. 111. Silicon-Boron Fluorides", "Journal of the American Chemical Society", Nov. 5, 1969, pp. 6315-6318, vol. 91, No. 23.
Hayton, L., et al., "An ESR study of the reaction of silver atoms with B2F4 under matrix isolation conditions", "J. Chem. Soc., Dalton Trans.", Mar. 8, 2002, pp. 1327-1329.
Pardoe, J., "Further Studies of Boronmonohalide and Polyboron Halide Chemistry", "Print", Oct. 2001, pp. 1-243, Publisher: University of Bristol, Published in: Thesis.

* cited by examiner

APPARATUS AND METHOD FOR PREPARATION OF COMPOUNDS OR INTERMEDIATES THEREOF FROM A SOLID MATERIAL, AND USING SUCH COMPOUNDS AND INTERMEDIATES

CROSS-REFERENCE TO RELATED APPLICATION

The benefit of priority under 35 USC 119 of U.S. Provisional Patent Application 61/378,375 filed Aug. 30, 2010 in the names of Oleg Byl, Joseph D. Sweeney, Robert Kaim, Richard S. Ray, and Edward E. Jones, for "APPARATUS FOR PREPARATION OF COMPOUNDS OR INTERMEDIATES THEREOF FROM A SOLID MATERIAL, AND METHODS OF USING SUCH COMPOUNDS AND INTERMEDIATES," is hereby claimed. The disclosure of U.S. Provisional Patent Application 61/378,375 is hereby incorporated herein by reference, in its entirety, for all purposes.

FIELD

The present disclosure relates to apparatus and method for preparing compounds or intermediates from solid reactant materials, and to methods of using such compounds and intermediates. In a specific aspect, the disclosure relates to apparatus and method of such type for preparation of boron-containing precursor compounds useful as precursors for ion implantation of boron in substrates.

BACKGROUND

Ion implantation is utilized extensively in the manufacture of microelectronic device products and in other industrial applications. In the ion implantation process, a chemical species is deposited in a substrate by impingement of energetic ions on the substrate. To produce the desired ions, a precursor is required that is susceptible to ionization resulting in an ionized medium that may variously include precursor fragments, positive ions, negative ions, and recombinant ionic and non-ionic species. This ionized medium is processed by extraction, magnetic filtering, acceleration/deceleration, analyzer magnet processing, collimation, scanning and magnetic correction to produce the final ion beam of the desired type of ions that is impinged on the substrate.

Precursors of widely varying type are utilized to form correspondingly varied implanted materials and devices. Illustrative precursors include argon, oxygen, hydrogen, and hydrides and halides of dopant elements such as arsenic, phosphorus, germanium, boron, silicon, etc. Boron in particular is a very widely used dopant element, and in recent years attention has been focused on increasing the efficiency and utilization of existing boron precursors and developing new ones.

One of the main steps in manufacturing of many integrated circuits involves implantation of boron into silicon wafers. Since elemental boron exhibits very low vapor pressure even at high temperatures, utilization of volatile boron-containing precursor compounds is necessary. Currently, boron trifluoride ($BF_3$) is widely used as a precursor for boron implantation. In 2007, worldwide consumption of $BF_3$ for ion implantation was estimated to be on the order of ~3000 kg, and this volume has continued to grow.

Despite its widespread utilization, $BF_3$ does have disadvantages. The $BF_3$ molecule is very difficult to ionize and only about 15% of all $BF_3$ flowed into the ion source chamber of conventional ionizers can be fragmented. The rest is discarded. Further, only about 30% of the ionized $BF_3$ is converted into $B^+$ ions that can be used for implantation. This results in low $B^+$ beam current that severely limits implantation process throughput.

Some increase of $B^+$ beam current can be achieved by varying the process parameters, such as by raising the extraction current, and by increasing the $BF_3$ flow rate. These measures, however, result in reduced life time of the ion source, high voltage arcing that in turn leads to tool instability, poor vacuum and beam energy contamination.

Throughput limitations associated with low $B^+$ beam current in the use of $BF_3$ have become more important in the semiconductor manufacturing industry in recent years due to the general trend in such industry to utilization of lower implantation energies. At lower implantation energies, the $B^+$ beam experiences a greater blow-out effect due to space charge.

A high-volume manufacturing capability for boron precursors that are reliable and cost-effective in character would therefore provide a major contribution to the art of semiconductor manufacturing as well as other ion implantation applications in which boron doping is employed.

SUMMARY

The present disclosure relates to apparatus and method for reacting a solid reactant material with a fluid to produce intermediate and final products, and to methods of using such intermediate and final products. In a specific aspect, the disclosure relates to apparatus and method of such type having utility for high-volume manufacturing of boron precursors useful in boron doping semiconductor applications.

In one aspect, the present disclosure relates to an apparatus, comprising:

a reaction region for contacting a gaseous reagent with a solid material under temperature and pressure conditions effective to form an intermediate species; and an opening for allowing an unreacted portion of the gaseous reagent and the intermediate species to exit the reaction region.

In such apparatus, the opening may be adapted to prevent blockage thereof during operation of the apparatus, e.g., by heating thereof, by appropriate sizing thereof in relation to the reaction region, or in other manner opposing blockage of the opening in use of the apparatus.

In another aspect, the present disclosure relates to a method of forming a final product as a reaction product of an intermediate product and a reactant gas, wherein the intermediate product is a gaseous reaction product of the reactant gas and a reactive solid, such method comprising conducting a reaction of the reactant gas and reactive solid in a first reaction zone, and a reaction of the reactant gas and intermediate product in a second reaction zone, wherein the reaction of the reactant gas and the reactive solid in the first reaction zone is reversible, and wherein the unreacted reactant gas and intermediate product are flowed to the second reaction zone at a controlled rate or in a controlled manner.

Other aspects, features and embodiments of the disclosure will be more fully apparent from the ensuing description and appended claims.

DETAILED DESCRIPTION

Figure 1:
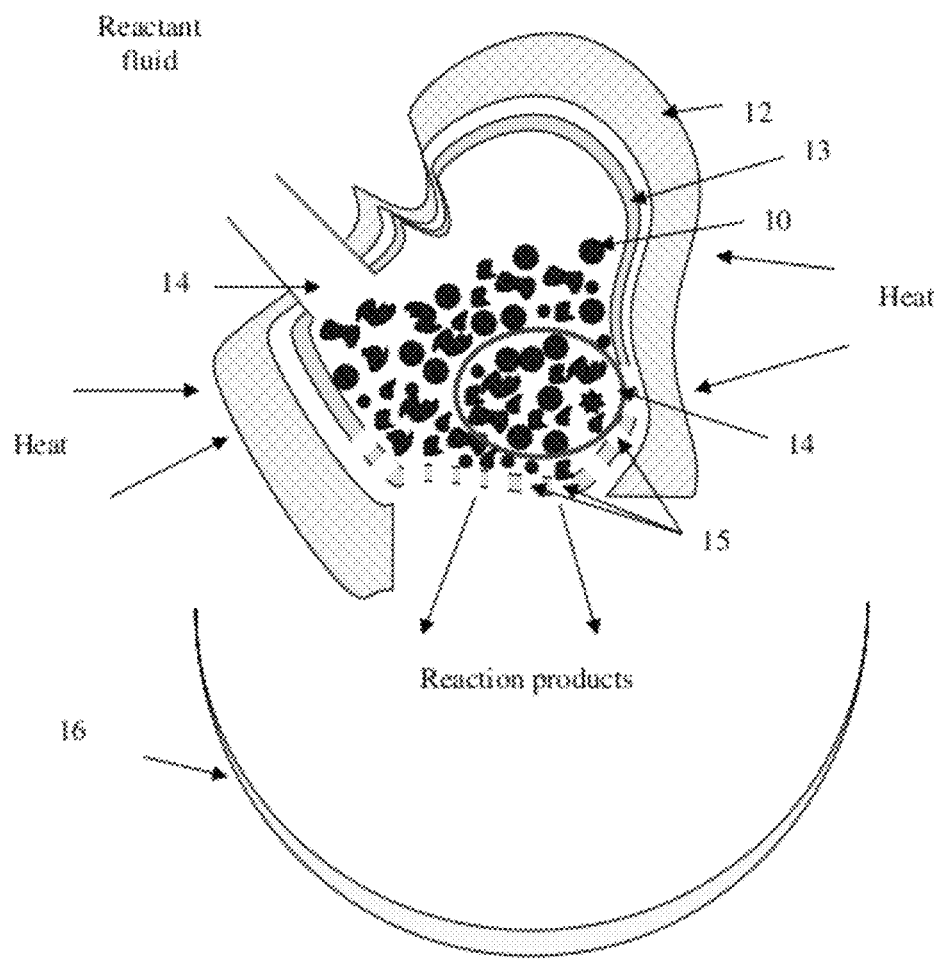
FIG. 1 is a schematic representation of a reactor system for reacting a solid reactant with a fluid, according to one embodiment of the disclosure.

The present disclosure relates to apparatus and method for producing intermediate and final products from reaction of fluids with solid reactant materials, and to methods of utilizing such intermediate and final products. In a specific aspect, the present disclosure relates to apparatus and methods of such type for manufacture of boron precursors and use of the resulting boron precursors in ion implantation operations.

In a specific aspect, the present disclosure relates to an apparatus and method for producing an intermediate product by reaction of a gaseous reactant with a reactive solid, and forming a final product at substantially lower temperature by reaction of the gaseous reactant with the intermediate product. In a further aspect of such apparatus and method, at least one of the reactive solid and the gaseous reactant can be isotopically enriched beyond natural abundance levels with a specific isotopic element or elements.

For example, one or both of the gaseous reactant and the reactive solid can comprise a boron-containing compound that contains a boron isotope in a concentration or ratio greater than a natural abundance concentration or ratio thereof, whereby the intermediate product and the final product may be correspondingly isotopically enriched.

The isotopically enriched final product can be a boron-containing compound having utility as a precursor for ion implantation, with the isotopically enriched character of the precursor affording benefits in the manufacture of microelectronic devices and corresponding products containing same.

The current trend in the evolution of microelectronic devices is toward shallower device junctions. This in turn creates a need for lower energy ion implantation to achieve such shallow junctions. Lower energy implants in turn impact productivity, introducing throughput limitations, and require that the ion beam utilized for device manufacture be highly efficient in the low ion beam energy environment.

As applied to boron precursors and ion implantation, specific boron precursors and more particularly isotopically enriched boron precursors can provide significant advantages over conventional non-enriched (natural abundance) boron precursors.

In a specific aspect of the present disclosure, diboron tetrafluoride ($B_2F_4$) is a precursor compound that provides advantages over traditional boron trifluoride precursors, particularly when the diboron tetrafluoride is isotopically enriched in boron beyond a natural abundance concentration or abundance ratio therein. For example, such isotopically enriched diboron tetrafluoride affords a higher beam current than boron trifluoride even when boron trifluoride is itself isotopically enriched. Isotopically enriched diboron tetrafluoride is able to be utilized in systems designed for use with boron trifluoride, and does not require any new process integration for such deployment.

Further, diboron tetrafluoride because of the nature of the boron-boron chemical bond, is significantly easier to dissociate and ionize than boron trifluoride. In consequence, the use of diboron tetrafluoride enables significantly higher beam currents to be achieved. AMU magnet selection can be utilized to select the same ions for implantation ($^{11}B$ or $^{11}BF_2$) as are selected when boron trifluoride is used as the precursor in a same ion implant tool. In addition, diboron tetrafluoride can be supplied in enhanced safety vessels, e.g., pressure-regulated supply vessels such as those commercially available under the trademark VAC from ATMI, Inc. (Danbury, Conn., USA), or in a sorbent-containing supply vessels in which the sorbent serves as a storage medium for diboron tetrafluoride.

Diboron tetrafluoride is a stable liquefiable gas, having a melting point of −56° C. and a normal boiling point of −34° C., and a vapor pressure at 21° C. of 9.54 bar.

To produce diboron tetrafluoride in accordance with the present disclosure, boron is contacted with $BF_3$ at elevated temperature to generate BF as an intermediate. This reaction, however, can result in clogging of the reaction cavity in which the reaction is conducted. Such clogging, in turn, prevents the reactor from operating for an extended period of time.

The clogging issue is overcome in accordance with one embodiment of the present disclosure by placing the boron solid reactant inside a casing with openings on its surface, with the bottom of the casing being provided with a retention structure that supports the boron solids and retains them in the interior volume of the casing, while allowing flow of reactive gas through the retention structure. The casing is inserted in a reaction cavity, which may for example be in the shape of a hollow cylinder formed of suitable material such as graphite. The inner diameter of such graphite cylinder is larger than the diameter of the casing so that the inner cylinder surface is in spaced relationship to the casing. In a specific arrangement, the casing and graphite cylinder can be arranged coaxially with respect to one another, so that an annular space is formed between them. The cylinder and casing are in direct flow communication with a cold trap that is cooled by a suitable coolant, such as liquid nitrogen or other heat transfer coolant medium, or other refrigeration source.

In this arrangement, boron solids can be loaded in the casing forming a bed of boron solids, with the casing disposed in a graphite reaction cavity of cylindrical geometry. This assembly can be suspended by a tube through which boron trifluoride is delivered to the reaction zone located in a predetermined part of the casing, so that the boron trifluoride reacts with the boron solids in such reaction zone, producing a boron fluoride (BF) intermediate.

The BF intermediate and the unreacted $BF_3$ can be discharged from the reaction zone into a cold trap directly, or can be discharged first into the reaction cavity and then into the cold trap. The BF intermediate and the unreacted $BF_3$ in such arrangement condense on the surface of the cold trap, with BF reacting with $BF_3$ to form $B_2F_4$. Once a sufficient amount of BF, $BF_3$ and $B_2F_4$ has condensed, the reactor is stopped and the cold trap is brought to higher temperature to allow evaporation of reaction products such as $B_2F_4$ and $B_xF_y$, and unreacted $BF_3$. The $B_2F_4$-containing gas mixture then can be pumped out of the cold trap and subjected to recovery treatment such as distillation to recover the $B_2F_4$, with $BF_3$ concurrently being recovered and recycled back to the reactor or subjected to other disposition or use.

In specific embodiments of this arrangement, the boron trifluoride is passed through the bed of boron solids with the reaction zone at elevated temperature up to 2200° C., e.g., a temperature in a range of from 1000° C. to 2200° C. Sub-ranges of temperature within such broad range of 1000° C. to 2200° C. that may be usefully employed in specific applications include sub-ranges in which the lower temperature limit of the sub-range may have any suitable value, e.g., 1000° C., 1050° C., 1100° C., 1150° C., 1200° C., 1250° C., 1300° C., 1350° C., 1400° C., 1450° C., 1500° C., 1550° C., 1600° C., 1650° C., 1700° C., 1750° C., 1800° C., 1850° C., 1900° C., 1950° C., 2000° C., 2050° C., 2100° C. or 2150° C., and wherein the upper limit of such sub-range has a value that is greater than the lower limit of the sub-range, e.g., an upper temperature limit of 1050° C., 1100° C., 1150° C., 1200° C., 1250° C., 1300° C., 1350° C., 1400° C., 1450° C., 1500° C., 1550° C., 1600° C., 1650° C., 1700° C., 1750° C., 1800° C., 1850° C., 1900° C., 1950° C., 2000° C., 2050° C., 2100° C., 2150° C. or 2200° C. in specific embodiments. Still other temperature ranges can be employed in the broad practice of the disclosure to produce BF, or other temperature ranges of suitable character can be utilized when the apparatus and methods herein disclosed are employed in the production of other intermediates and final products.

The location of the reaction zone may be determined by the geometry of the casing and reaction cavity, and the spatial arrangement thereof, as well as by the spatial temperature profile in the reaction zone.

Pressure in the reaction of boron solids and boron trifluoride, in specific embodiments, can be at any suitable value, e.g., pressure in a range of from 10^-6 to 1,000 torr.

The boron solids utilized for the formation of intermediate BF can be of any suitable size and shape characteristics, e.g., size and shape characteristics that permit the solids to be loaded into the casing installed in the reaction cavity to which $BF_3$ is delivered, so that the reactive solids in the casing are contacted sufficiently with boron trifluoride to produce boron fluoride (BF) intermediate in a desired quantity.

The boron solids can for example have a diameter or characteristic major dimension that is in a range of from 1 mm up to 5 cm or more depending on the scale of the reactor apparatus and the retention structure that is used to retain the solids in the casing within the reaction cavity. Retention structures can be of any suitable type or types, including for example screens, grids, rods, offset plates, cups, metal or non-metal wool plugs, etc. The boron solids can be arranged in any suitable manner that permits the BF intermediate to be discharged from casing so that it is captured in the cold trap.

The above-described arrangement avoids clogging by providing an efficient exit port for BF discharge from the casing and reaction cavity, without substantially decreasing the contact area between $BF_3$ and B, and by maintaining an appropriate temperature profile in the reaction cavity and casing so that the equilibrium of the reaction

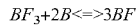
$$BF_3 + 2B \Longleftrightarrow 3BF$$

is maintained in the forward reaction direction, so that clogging caused by boron metal deposition resulting from the backward direction of the reaction (i.e., reverse reaction) is avoided.

In a specific embodiment, the boron solids are loaded in a cylindrical casing that may also be formed of graphite, or alternatively of another suitable material of construction, and the casing then is deployed in a cylindrical reaction cavity, preferably so that the casing is centered in the cylindrical cavity, although other non-centered arrangements can also be effected. The casing advantageously is provided with holes in a lower section thereof, so that $BF_3$ enters from the top of the casing, passing through the boron solids and reaching in the perforated section where the reaction zone is located. The resulting BF generated in the reaction zone from the reaction of the $BF_3$ and B reactants exits the holes of the casing and then flows downwardly into the cold trap. Clogging at the bottom of the casing and reaction cavity is reduced by the provision of a gap between the casing and reaction cavity.

The positioning of the reactor assembly including the casing and the reaction cavity may employ a horizontal or vertical orientation or an angular orientation at any angle between the horizontal and vertical positions of the reactor assembly. The shape of the openings in the perforated casing disposed in the reaction cavity can be uniform or non-uniform in character, and may be circular or may have other geometric shapes, consistent with the objective of maintaining open pathways for flow of boron fluoride and boron trifluoride out of the casing, while concurrently effecting appropriate contact between boron trifluoride and the boron solids. The shape and/or size of the boron solids can be uniform or non-uniform in character.

More generally, the characteristics of the openings in the casing within the reaction cavity, and the morphology, shape, crystallinity and size of the boron solids deployed in the reaction are parameters that can be individually or combinatorially tailored to optimize the reaction between the boron solids and boron trifluoride.

Considering the lower temperature reactor, e.g., cold trap, that is provided downstream from the high temperature reactor in which boron trifluoride and elemental boron are reacted to form boron monofluoride, it is to be noted that the size, shape and character of the cold trap are additional parameters that can be adjusted to optimally achieve more uniform deposits of material from the intermediate-containing stream flowed from the higher temperature reaction zone to the cold trap, while maintaining suitable vacuum conditions in the cold trap. Extended surface structures, e.g., cold fingers, fins, or the like, can be provided in the cold trap to increase surface area for condensation of material in the intermediate-containing stream that is flowed from the higher temperature reaction zone to the cold trap.

The cold trap can be periodically cleaned with water to remove solid boron fluoride residues, e.g., higher/polymeric boron fluoride species of the formula $B_xF_y$, wherein x and y have stoichiometrically appropriate values. In operation, the cold trap can be cooled with liquid nitrogen or other suitable cryogen. Temperature at the bottom of the cold trap can be on the order of −196° C. when liquid nitrogen is used as the coolant.

The cold trap can also be operated in specific implementations, to pre-condense boron trifluoride therein, to thereby increase production of diboron tetrafluoride when the intermediate-containing reaction mixture is subsequently flowed to the cold trap.

The reaction product mixture that is extracted or off-loaded from the cold trap may contain 5%, 10%, 20%, 30%, 40%, 50% or higher concentrations of diboron tetrafluoride, with the remainder being boron trifluoride and trace amounts of volatile heavy boron fluorides.

The reaction system of the present disclosure can be deployed with various specific features and in various specific arrangements for high-efficiency continuous operation. For example, instead of reactor containing a single reaction cavity and a single casing loaded with boron, high temperature reactor assemblies can be provided with multiple, independent reaction cavities and multiple casings that can be operated, maintained, and refilled independently of one another.

Considering the lower temperature reactor used to produce by diboron tetrafluoride by reaction of boron monofluoride and boron trifluoride, such reactor can be provided as a cold trap comprising a sufficiently cooled surface element, such as a plate member or a plate member with extended surface, which is conveyed into a cavity of the cold trap to receive and condense BF, $BF_3$ and $B_2F_4$. Once such receiving plate member is sufficiently coated with condensed material, it is conveyed out of the cavity and replaced with a fresh receiving plate member.

In another arrangement, the high temperature assembly can be positioned over a low-temperature compartmented cold trap within a reactor. Such assembly can be translated in any suitable manner to different compartments of the reactor, with the specific cold trap compartment being deposited with BF, $BF_3$ and $B_2F_4$ in an isolated state relative to the rest of the reactor (e.g., with the rest of the reactor undergoing cleaning or "off-loading" of condensed products that have already been deposited in other cold trap compartments).

The reactor system, including a high temperature assembly for solid/fluid reaction to form the intermediate, and a cold trap for further fluid reaction with the intermediate, may have any suitable geometry, size and scale, in which the reaction zone and the cold trap are in fluid flow communication to permit flow of gas mixture including the intermediate product into the cold trap zone for further reaction to form the final product.

Referring now to the drawings, FIG. 1 is a schematic representation of a reactor system for reacting a solid reactant 10 with a fluid ("Reactant fluid"). In this arrangement, a high temperature assembly includes the reaction cavity 12 encompassing a casing 13 in which the reactive solids 10 are loaded. The reactant gas is introduced through an inlet 14 into the bed of reactive solids. Heat is provided to the assembly in any suitable manner to achieve a favorable temperature spatial profile within the assembly and to create a reaction zone 14 where an intermediate product is formed. The location of the reaction zone is determined by the geometries of the reaction cavity 12, casing 13, and temperature profile. The intermediate product together with unreacted fluid is discharged from the reaction zone through perforations 15 in the casing and flows out of the reaction cavity into the cold trap 16. In the cold trap, the intermediate product reacts with the reactant gas to form a final product.

In a specific implementation, the reaction of the reactant gas and intermediate product is reversible, and the reactant gas and intermediate product are flowed to the second reaction zone (cold trap 16) at a controlled rate or in a controlled manner, to suppress back reaction forming the reactive solid.

Figure 2:
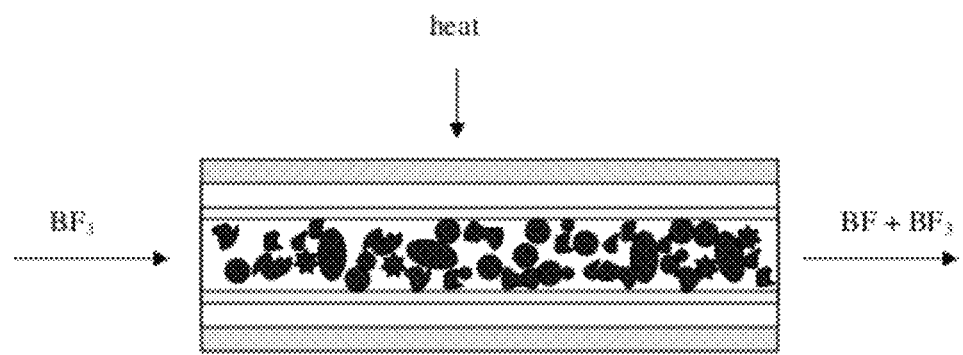
FIG. 2 is a schematic representation of a reactor system for reacting a solid reactant with a fluid, according to another embodiment of the disclosure.

In another embodiment, shown in FIG. 2, $BF_3$ is introduced to an elongated high temperature assembly to react with solid particles of boron metal that are heated to appropriate temperature. The solid particles of boron metal in such arrangement are provided in a casing that is coaxial with the cylindrical reactor housing surrounding it. In the reaction zone in the casing, boron metal and boron trifluoride react to form BF, and BF and unreacted $BF_3$ are discharged from the reaction zone.

The casing may be porous, or may have openings therein. For example, the casing may be provided with openings in its side walls, of any suitable size, shape and character. In one embodiment, a plurality of openings is formed along the surface of the casing. The plurality of openings may have size that is variable along a predetermined direction. The size of the openings may increase, or alternatively decrease, along the predetermined direction. The openings may be arranged in any suitable manner to maximize the production of the desired intermediate BF in the reaction chamber.

The high temperature assembly can be oriented horizontally, vertically or at any angle in between.

It will be recognized that the reaction zone for contacting boron trifluoride with boron metal solids can be of any of widely varying arrangements and configurations, it being necessary only that the diboron tetrafluoride manufacturing apparatus include a higher temperature reaction zone for forming the boron monofluoride intermediate in gaseous form, and a lower temperature recovery zone in which the boron monofluoride is condensed to solid form and reacted with available boron trifluoride to form the diboron tetrafluoride.

It will be further recognized that while the preceding and subsequent disclosure are primarily directed to synthesis of diboron tetrafluoride, the apparatus and methodology of the invention are applicable to synthesis of a wide variety of different intermediate compounds formed from a solid reactant species with a reactive gas to produce a gaseous product that is condensable to a liquid or solid form, in which form the liquid or solid undergoes further reaction with available gas to form an end product.

As an alternative to the specific arrangement shown, the solids in the casing instead of being packed in the interior volume of the casing, as illustrated, may be packed into the annular space between the casing and the reaction cavity wall, or the solids may be otherwise supported for presentation to the gaseous reactant.

The casing and reaction cavity can be advantageously formed of graphite or other carbonaceous material. Graphite is preferred for such purpose because heat can be readily resistively generated in such material, such as by oscillating currents induced by a radio frequency (RF) field of an electrical coil that is circumscribingly positioned in relation to the cylindrical cavity and the casing containing the reactive solids. The RF coil provides a simple and effective arrangement for achieving the elevated temperatures required for reaction of boron trifluoride with the boron solids in the casing holding such solids. The casing as previously described may be foraminous in character, being constructed of a porous sorbent permeable material, or alternatively having one or more openings therein for egress of the intermediate that is formed in the high temperature reaction therein.

Although graphite is preferred for construction of the boron solids-containing casing, ceramics or other high temperature materials can be employed, provided that they withstand temperatures of up to 2000° C., and are inert to boron trifluoride across the full temperature range of interest.

Thus, various reactor configurations are contemplated within the scope of the present disclosure, wherein boron trifluoride is reacted with elemental boron at high temperature to form boron monofluoride, and the resulting boron monofluoride is reacted with boron trifluoride at low temperature, e.g., cryogenic temperature, to form diboron tetrafluoride ($B_2F_4$) and heavier boron fluoride compounds. Since the reaction of boron trifluoride and elemental boron is reversible, the reactor configurations are desirably adapted to maximize the production of the intermediate boron monofluoride in any suitable manner that controls the corresponding reaction to favor BF production.

The high temperature reactor in various embodiments is provided as a vertically elongate reactor defining an interior reaction cavity in which elemental boron solids held in a casing can be contacted with boron trifluoride introduced at the upper end of the reactor in a downflow mode of operation, with reaction products including BF and unreacted $BF_3$ being discharged at the lower end of the reactor. To control the reaction and maximize the production of BF, a second boron trifluoride inlet may be arranged to introduce boron trifluoride at an intermediate portion of the vertical reactor, so that the reaction is driven in the forward direction by the excess added boron trifluoride.

In addition to single-pass (once through) flow arrangements for contacting of boron trifluoride gas with boron solids, the present disclosure contemplates the provision of arrangements in which boron trifluoride is recirculated, and augmented by make-up boron trifluoride introduced in a recirculation loop, to achieve high-rate continuous production of boron fluoride (BF).

Figure 3:
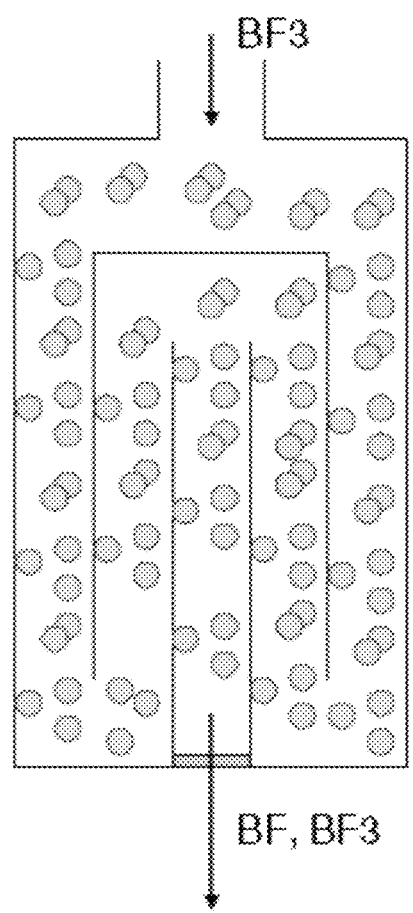
FIG. 3 is a schematic representation of a multipass high temperature reaction zone in which three flow passes of the reactant gas are provided for achieving contact with the reactive solid.

The present disclosure also contemplates the provision of multipass high-temperature reaction zones in which boron trifluoride gas is contacted with boron solids along an extended flow path involving multiple passes of reactant gas with the reactive solid. An illustrative example of a high-temperature reaction zone of such type is shown in FIG. 3. As shown in FIG. 3, boron trifluoride reactant gas enters the high-temperature reaction zone at the upper end of the outer housing. In the interior volume of the housing is located an inverted cup-shaped baffle structure, and within the inverted cup-shaped baffle structure is disposed a final pass tubular flow passage, with the entire volume within the housing being filled with the reactive solid (boron-containing solid). From the final pass tubular flow passage, boron monofluoride (BF) and unreacted boron trifluoride are discharged at a lower end of the housing.

Consistent with the preceding discussion, the reactive solid used in the broad practice of the present disclosure may be provided in any size particles or discontinuous forms, including powder, granules, pellets, platelets, solid films on substrate carrier particles, etc. In addition, multimodal particle size distributions can be employed, to reduce void volume in the bed of solid reactive particles, and to maximize the amount of reactive solid per unit volume of the casing in which the bed of solid reactive particles is reposed.

In the lower temperature zone employed for condensation of solid intermediate (BF), liquid nitrogen has been described as an illustrative coolant. Other refrigerant media can be employed in specific applications, including, without limitation, liquid oxygen, liquid helium, etc.

Concerning the use of graphite materials for the reactive solid contacting zone through which reactant gas is flowed, and the use of RF coils to resistively heat such graphite materials to reaction temperatures, it will be appreciated that the coil spacing, diameter, shape, use of multiple coils, etc. will influence the geometry and strength of the exerted RF field. The RF coils can be appropriately constructed and arranged to provide effective axial and radial temperature profiles inside the elevated temperature reaction zone, in order to achieve efficient production of the BF intermediate as a reaction product of the reactive solid and reactant gas in the reaction zone, within the skill of the art, based on the disclosure herein.

In general, the reaction product yielded in the lower temperature reaction zone (cold trap) can be subjected to any suitable recovery techniques and processes, whereby the desired product is recovered. The recovery may entail purification techniques of varied types, to obtain the desired product, e.g., $B_2F_4$, in high purity and high volume. For example, the recovery of final product from the lower temperature zone can be carried out by the use of cryogenic distillation and/or trap-to-trap separation techniques.

Recycle of reaction product components from the lower temperature reaction zone may be useful in specific implementations of the disclosure. For example, $B_xF_y$ components of the reaction product mixture from the lower temperature reaction zone can be subjected to heating, to decompose same to form solid boron as a recovered byproduct of the lower temperature reaction zone reaction process.

Further, the reaction product mixture produced in the lower temperature reaction zone can be subjected to isotopic separation, to provide diboron tetrafluoride enriched in $^{11}B$ beyond natural abundance, as a product that may be highly useful in applications such as ion implantation procedures. In such procedures, AMU magnet separation can be employed to select for $^{11}B$-containing ions or ionic fragments, to achieve improvements such as higher ion beam current. Isotopically-enriched diboron tetrafluoride can also be utilized in plasma immersion implantation processes, and in other types of ion implantation.

More generally, the apparatus and method of the present disclosure can be utilized to prepare a variety of boron compounds that are isotopically enriched beyond natural abundance in one of $^{10}B$ and $^{11}B$. Such boron compounds may be useful for ionization to produce ionic species, e.g., one or more ionic species selected from the group consisting of $B_2F_4^+$, $B_2F_3^+$, $B_2F_2^+$, $BF_3^+$, $BF_2^+$, $BF^+$, $B^+$, $F^+$, $B_2F_4^{++}$, $B_2F_3^{++}$, $B_2F_2^{++}$, $BF_3^{++}$, $BF_2^{++}$, $BF^{++}$, $B^{++}$, $F^{++}$, $B_2F_4^{+++}$, $B_2F_3^{+++}$, $B_2F_2^{+++}$, $BF_3^{+++}$, $BF_2^{+++}$, $BF^{+++}$, $B^{+++}$, and $F^{+++}$, and mixtures thereof, the boron-containing ones of which are isotopically enriched beyond natural abundance of $^{10}B$ or $^{11}B$.

Boron-containing compounds of widely varied type can be synthesized utilizing boron solids with which reactant gases are contacted, and can include any number of boron atoms. In one embodiment, the boron-containing compound contains at least two boron atoms. In another embodiment, the boron-containing compound contains from 2 to 80 boron atoms, including diboron compounds such as $B_2F_4$, triboron compounds, tetraboron compounds such as $(F_2B)_3BCO$, pentaboron compounds, hexaboron compounds, septaboron compounds, octaboron compounds, nonaboron compounds, decaboron compounds, undecaboron compounds, dodecaboron compounds, etc., up to $B_{80}$ compounds such as $B_{80}$ analogs of fullerenes.

In other embodiments, the boron-containing compound can contain 2, 3, 4, 5, 6, 7, 8, 9, 10, or 11 boron atoms. Additional embodiments may comprise cluster boron compounds. In still other embodiments, the boron-containing compound can be a diboron compound. In other embodiments, the boron-containing compound can comprise diboron compounds other than particular boron-containing compound species, e.g., diboron compounds other than diborane. It will therefore be appreciated that the present disclosure contemplates a wide variety of classes of boron-containing compounds, as residing within the broad scope of the disclosure.

In one embodiment, involving synthesis of isotopically-enriched, boron-containing compounds in accordance with the present disclosure, the desired isotope is atomic mass 10 boron and the natural abundance concentration is about 19.9%. In such boron compounds, the concentration of atomic mass 10 boron isotope can for example be greater than 19.9%, 20%, 25%, 30%, 35%, 40%, 45%, 50%, 55%, 60%, 65%, 70%, 80%, 85%, 90%, 95%, 96%, 97%, 98%, 99%, 99.9%, or 99.99%, in specific compositional variants. For example, the concentration of atomic mass 10 boron isotope can be 20-25%, 25-30%, 30-35%, 35-40%, 40-45%, 45-50%, 50-55%, 55-60%, 60-65%, 65-70%, 70-75%, 75-80%, 80-85%, 85-90%, 90-95%, 95-99% or 95-99.9%. In other embodiments, the concentration of atomic mass 10 boron isotope can be 20-30%, 30-40%, 40-50%, 50-60%, 60-70%, 70-80%, 80-90%, or 90-99%. In various ones of these various embodiments, the boron-containing compound contains two boron atoms. All isotopic percentages herein are molar percentages.

In another embodiment, involving synthesis of isotopically-enriched, boron-containing compounds in accordance with the present disclosure, the desired isotope is atomic mass 11 boron and the natural abundance concentration is about 80.1%. In such boron compounds, the concentration of atomic mass 11 boron isotope can for example be greater than 80.1%, 85%, 90%, 95%, 96%, 97%, 98%, 99%, 99.9% or 99.99%, in specific compositional variants. For example, the concentration of atomic mass 11 boron isotope can be 81-85%, 85-90%, 90-95%, 95-99%, 95-99.9%. In a specific embodiment, the concentration of atomic mass 11 boron isotope can be 81-90% or 90-99%. In various ones of these various embodiments, the boron-containing compound contains two boron atoms.

In various embodiments involving isotopically-enriched, boron-containing compounds as described above, as manufactured in accordance with the present disclosure, the boron-containing compound has a chemical formula of $B_2F_4$. In various other embodiments of the synthesis of isotopically-enriched, boron-containing compounds as described above, the boron-containing compound may contain any suitable number of boron atoms, e.g., 3, 4, 5, 6, 7, 8, 9, 10, or 11 boron atoms.

Boron-containing compounds manufactured in accordance with the present disclosure can be utilized in many different applications, including use as precursor compounds for ion implantation, in which the boron-containing compound is ionized to generate boron ions, which then are implanted in a substrate.

Notwithstanding the low incidence of deposits on surfaces of the high temperature reactor that is used to form boron monofluoride by reaction of solid boron with boron trifluoride, some residues will form in the reactor and accumulate over long periods of operation, requiring periodic cleaning of the reactor. Such cleaning may be effected in any suitable manner, with any suitable cleaning reagents. In various embodiments, cleaning of the reactor surfaces can be carried out with vapor-phase cleaning reagents such as fluorine, xenon difluoride, nitrogen trifluoride, and the like, with or without plasma activation of such cleaning agents.

The lower temperature reaction zone, in accordance with the present disclosure, can be augmented in various ways, to remove specific components of the reaction product mixture, such as species that may be deleterious to downstream pumps, compressors or other flow circuitry components. Multiple traps may be provided for product recovery.

In specific apparatus arrangements, the high temperature assembly of the present disclosure may be suspended by a shaft on which the reaction cavity is mounted, and arranged so that such shaft is concurrently heated upon heating of the cavity. This may be beneficial in pre-heating the reactant gas $BF_3$, and such pre-heating may be further augmented by dedicated heaters or heat exchange arrangements effecting increase of the reactant gas temperature to a desired level.

The reactor system of the present disclosure may employ any suitable monitoring and control components, assemblies and arrangements, to achieve desired operational conditions during processing of feed gas for contacting with the reactive solid to form the intermediate product, and subsequent reaction of the intermediate to obtain final product. For example, the pressure of the cold trap can be monitored to ensure that consistent low vacuum conditions are maintained in the trap, and flow controllers such as mass flow controllers, flow control valves, restricted flow orifice elements, gas flow regulators, pressure switches, etc., may be employed to regulate flow of reactant gas to the higher temperature reaction zone for contacting with the reactive solid. In general, any suitable monitoring and control arrangements may be implemented, which serve to beneficially operate the reactor system, so that intermediate and final products of appropriate character are obtained.

Accordingly, monitoring and control components, assemblies and arrangements can be employed to control temperature and pressure in the reactive solid contacting reaction zone, as well as in the intermediate product processing zone that is utilized to produce the final product. Alternatively, other monitoring and control modalities may be employed to modulate other system variables and parameters, to achieve beneficial operation of the process system.

The reactive solid used in the higher temperature reaction zone can be of any appropriate type. In the production of boron compounds such as diboron tetrafluoride, solid boron has been illustratively described as a suitable solid reactant. In other embodiments, it may be desirable to use reactive solids other than boron metal for the contacting. For example, boron carbide, boron silicide, or other boron compounds may be useful as reactive solids for production of intermediate products that are subsequently processed to form final products.

Thus, it is appreciated that the present disclosure can be implemented in widely varying forms. Various aspects and features of the apparatus and method of the present disclosure are summarized below.

In one aspect, the disclosure contemplates an apparatus, comprising:

a reaction region for contacting a gaseous reagent with a solid material under temperature and pressure conditions effective to form an intermediate species; and an opening for allowing an unreacted portion of the gaseous reagent and the intermediate species to exit the reaction region, wherein the opening is adapted to prevent blockage thereof during operation of the apparatus.

In specific embodiments, the opening may variously be constituted by a single opening, or alternatively by a multiplicity of openings, to accommodate discharge of the intermediate species and unreacted gaseous reagent from the reaction region. The opening may be constituted by a lumen or passage, or other structural arrangement enabling the specified discharge of the intermediate species and unreacted gaseous reagent, e.g., to a further reactor in which the intermediate species and unreacted gaseous reagent are further reacted to form final product.

Such apparatus can include a process control system that is constructed and arranged to establish and maintain selected temperature and pressure conditions in the reaction region, e.g., pressure in the reaction region in a selected range, and/or temperature in the reaction region in a range of from 1000° C. to 2200° C. The pressure in the reaction region can be maintained at any suitable level. In various embodiments, the pressure in the reaction region can be in a range of from $10^{-6}$ to 1,000 torr, and more preferably in a range of from 0.10 torr to 10 torr. A pressure gradient exists in the reaction region, from an upstream portion to a downstream portion thereof. In a specific example, wherein the reaction region is in an interior volume of a reactor housing of cylindrical form, the pressure at the exit of the cylinder in various embodiments can be in a range of from $10^{-2}$ to $10^{-3}$ torr.

The flow rate of the gaseous reagent can be selected to provide appropriate levels of production of the intermediate product. In one embodiment, wherein the gaseous reagent is boron trifluoride, the flow rate can be in a range of from 500 sccm to 1200 sccm, or even higher with more efficient cooling, and the orientation of flow can be varied to optimize contact with the reactive solid. With scale-up to large size reactors, correspondingly larger flows of $BF_3$ can be utilized.

The apparatus can further include a heat source for heating the reaction region. For example, the heat source can be adapted to maintain predetermined temperature in the reaction region by a heating modality comprising at least one of conduction heating, induction heating, convective heating, resistive heating, and radiation heating. The heat source in such respect can be adapted to maintain temperature in the reaction region that is effective to prevent deposition and/or condensation of material in the reaction region, e.g., temperature in the reaction region in a range of from 1000° C. to 2200° C.

In specific embodiments, the opening that is employed for discharge of the intermediate and unreacted gaseous reactant from the reaction region may be heated to a predetermined temperature, in order to prevent build-up of condensable or solidifiable material at such opening.

The apparatus used for production of intermediate can comprise a reaction chamber, comprising or comprised in the reaction region. Such reaction chamber can comprise a plurality of openings formed along its surface. As previously discussed, the plurality of openings can have size that is variable along a predetermined direction, e.g., increasing in size along the predetermined direction, or decreasing in size along the predetermined direction. The reaction chamber can be formed of a material comprising graphite. The apparatus in a specific embodiment can include a gas flow passage for flow of the gaseous reactant to the reaction chamber.

In the apparatus, the aforementioned opening may be coaxial with a direction of introduction of the gaseous reagent, or alternatively, may be non-coaxial therewith.

In a specific embodiment of the apparatus, the gaseous reagent comprises $BF_3$ and the solid material comprises boron metal. The $BF_3$ can comprise $BF_3$ that is isotopically enriched in $^{10}B$ or $^{11}B$. Independently, the boron metal or other reactive boron-containing material can be isotopically enriched in $^{10}B$ or $^{11}B$.

In the apparatus, the solid material can be in the form of discrete particles. Such discrete particles can be sized and shaped to enhance contact with the gaseous reagent, in relation to the extent of contact that is effected by discrete particles that are not so sized and shaped. The discrete particles can comprise particles having shape selected from the group consisting of spherical shapes, cylindrical shapes, irregular shapes, cubic shapes, cone shapes, disc shapes, granular shapes, and combinations thereof.

In the apparatus, the solid reagent can be in a granular or powder form.

In any of the embodiments of the apparatus described hereinabove, the apparatus can further comprise a reduced temperature region for effecting reaction between the intermediate species and the unreacted portion of the gaseous reagent to produce a reaction product. Such apparatus can comprise a process control system that is arranged to effect selected temperature and pressure conditions in the reduced temperature region, e.g., temperature in a cryogenic temperature range and pressure in a vacuum pressure range.

In the apparatus, the reduced temperature region can be cooled by liquid nitrogen.

The apparatus can be arranged, so that reaction between the intermediate species and the unreacted portion of the gaseous reagent occurs at or on a surface of the reduced temperature region, with the apparatus further including a cooler for cooling the reduced temperature region. The apparatus additionally, or alternatively, can be arranged so that the gaseous reagent and intermediate species undergo a condensation.

The apparatus can further comprise a passageway for flowing additional gaseous reagent into the reduced temperature region to drive reaction therein toward a desired reaction product.

In the apparatus, wherein reaction between the intermediate species and the unreacted portion of the gaseous reagent occurs at or on a surface of the reduced temperature region, the apparatus can further comprise an extended surface structure on or associated with the surface for cooling of the reduced temperature region.

The apparatus can also be arranged, so that the reduced temperature region includes a recovery apparatus for recovering the reaction product from a mixture produced in the reaction between the intermediate species and the unreacted portion of the gaseous reagent. Such recovery apparatus in one embodiment includes a cryogenic distillation apparatus. In another embodiment, the reduced temperature region includes a cold trap and the recovery apparatus includes at least one additional cold trap. The apparatus can be arranged so that at least one component of the reaction region is thermally isolated from the reduced temperature region.

The apparatus can be constituted, as comprising a boron-containing composition or boron-containing residue therein, e.g., a boron-containing composition containing at least one of $BF_3$ and $B_2F_4$.

The apparatus may be arranged so that the reaction region and reduced temperature region are respectively defined by reaction chambers that are coupled in gas flow communication with one another.

The apparatus can be constructed with the reaction region being arranged for multipass contacting of the gaseous reagent and solid material.

The apparatus can be arranged, as comprising two or more reaction regions adapted to permit replenishment of the solid material in a selected reaction region without interruption of operation of the apparatus. In such apparatus, the two or more reaction regions can be arranged in a spaced-apart relationship, e.g., in an equally spaced-apart relationship. The two or more reaction regions can be disposed in fluid flow communication with an inner cavity of the reduced temperature region, and extend radially outward from an external surface of the reduced temperature region.

The disclosure also contemplates a method of forming a final product as a reaction product of an intermediate product and a reactant gas, wherein the intermediate product is a gaseous reaction product of the reactant gas and a reactive solid, in which such method comprises conducting a reaction of the reactant gas and reactive solid in a first reaction zone, and a reaction of the reactant gas and intermediate product in a second reaction zone, wherein the reaction of the reactant gas and the reactive solid in the first reaction zone is reversible, and wherein the unreacted reactant gas and intermediate product are flowed to the second reaction zone at a controlled rate or in a controlled manner.

In such method, the first reaction zone can be operated at temperature in a range of from 1000° C. to 2200° C., and the second reaction zone can be operated at cryogenic temperature.

The method may be carried out, wherein reactant gas and intermediate product are flowed to the second reaction zone at spaced-apart intervals along a length of the first reaction zone.

In a specific embodiment of the method, the reactant gas comprises boron trifluoride, the reactive solid comprises boron, the intermediate product comprises boron monofluoride, and the final product comprises diboron tetrafluoride.

The method may be carried out in a specific implementation in which at least one of the reactant gas and reactive solid comprises a boron-containing material that is isotopically enriched beyond natural abundance in one of $^{10}B$ and $^{11}B$. The boron-containing material may for example be isotopically enriched beyond natural abundance in $^{10}B$, or it may be isotopically enriched beyond natural abundance in $^{11}B$.

The method of the disclosure may be practiced in a manner involving periodically cleaning at least one of the first and second reaction zones. Such cleaning may for example comprise use of xenon difluoride as a cleaning agent.

The method may be carried out, as involving recovery of the final product from a reaction mixture generated by the reaction of the reactant gas and intermediate product in the second reaction zone. Such recovery and purification of $B_2F_4$ may comprise cryogenic distillation, or trap-to-trap recovery of the final product.

Figure 4:
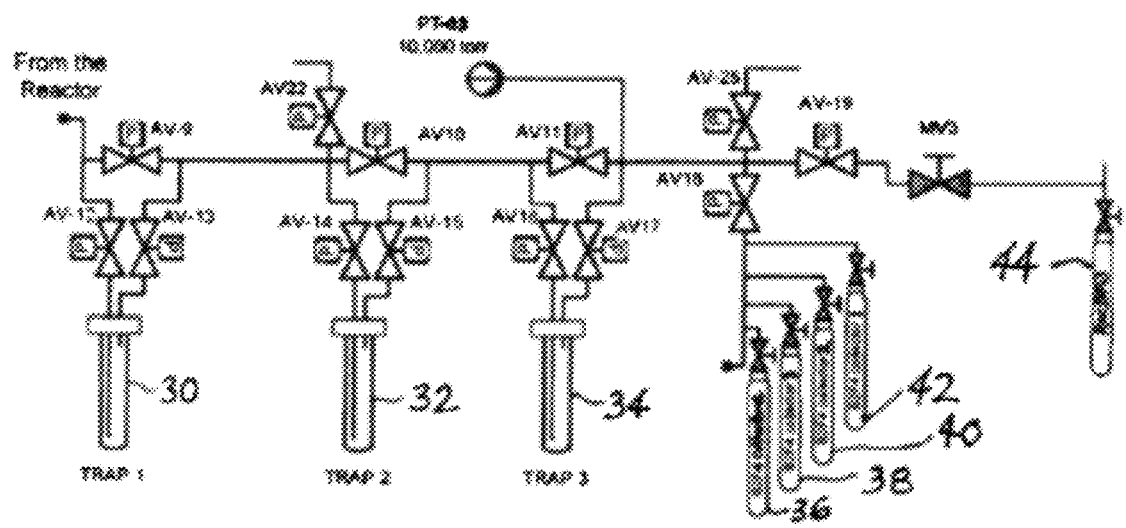
FIGS. 4 and 5 show an illustrative trap-to-trap recovery apparatus according to one embodiment of the disclosure, which may be used to increase purity of a crude $B_2F_4$-containing reaction product mixture to 90% purity (FIG. 4 apparatus), following which the $B_2F_4$ is purified to 99.99% purity (FIG. 5 apparatus).
Figure 5:
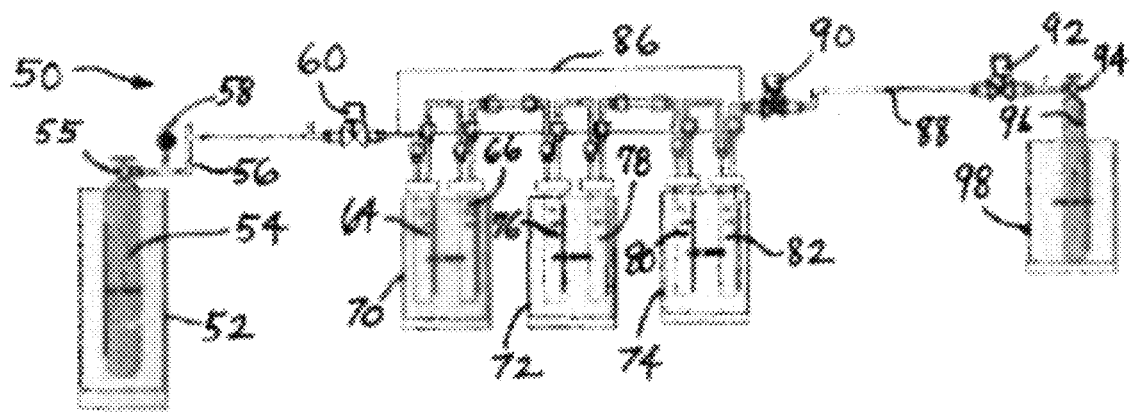

FIGS. 4 and 5 show an illustrative trap-to-trap recovery apparatus according to one embodiment of the disclosure, which may be used to increase purity of a crude $B_2F_4$-containing reaction product mixture. The crude reaction product mixture may for example contain 25% by weight of $B_2F_4$ and 75% by weight of $BF_3$. The apparatus shown in FIG. 4 may be employed to process such crude reaction product mixture to increase purity of $B_2F_4$ from the initial 25% purity, to 90% purity, following which the 90% purity $B_2F_4/BF_3$ mixture can further processed by the apparatus shown in FIG. 5 to increase the $B_2F_4$ purity from the initial 90% value to 99.9% purity.

In the FIG. 4 apparatus, the crude reaction product $B_2F_4/BF_3$ mixture ("From the reactor") is flowed through the inlet line, containing flow control valve AV-12, into vessel 30 of Trap 1. Trap 1 is maintained at temperature suitable for preferential condensation of $B_2F_4$ over $BF_3$. The reactor in turn is operated at pressure capable of providing optimal flow of gas mixture into the Trap 1 in order to sustain preferential capture of $B_2F_4$. From vessel 30 of Trap 1, the gas mixture flows in discharge line containing valve AV-13 to the manifold line containing vessel bypass valves AV-9, AV-10, and AV-11, and coupled with vent/recycle lines containing valves AV-22 and AV-25, respectively.

To capture $B_2F_4$ that passes Trap 1 the gas mixture from Trap 1 in the manifold line flows in the inlet line, containing flow control valve AV-14, into vessel 32 of Trap 2, and from vessel 32 of Trap 2, the gas mixture flows in discharge line containing valve AV-15 to the manifold line, and then flows in inlet line containing flow control valve AV-16 into vessel 34 of Trap 3. Trap 2 and Trap 3 are maintained at temperatures suitable for further preferential condensation of $B_2F_4$. The $B_2F_4$-depleted gas consisting substantially of $BF_3$ then flows from vessel 34, in the discharge line containing valve AV-17, into the manifold line from which it flows to the $BF_3$ collection vessel 44 (valves AV-19 and MV-3 being open for such purpose, and valves AV-9, AV-10, AV-11, AV-18, AV-22 and AV-25 being closed during flow of the crude reactor effluent gas mixture through the Traps 1-3).

The $BF_3$ collection vessel, during such series flow of the crude reactor effluent gas mixture through the Traps 1-3, is maintained at temperature suitable for condensation of $BF_3$. During the series flow of the crude reactor effluent gas mixture through the Traps 1-3, $B_2F_4$ and $B_xF_y$ are captured in the three traps as solid, and $BF_3$ flows until it is captured in the $BF_3$ collection vessel. This process continues until all of the crude reactor effluent is transferred from the reactor.

Once the crude reactor effluent transfer to the FIG. 4 system is complete, the reactor is closed to further flow, and the valve in the valve head assembly of the $BF_3$ collection vessel is closed. The $B_2F_4$ collection vessel or vessels (shown in FIG. 4 as a vessel array including vessels 36, 38, 40, and 42), is/are cooled and maintained at temperature of −195° C.

The three traps including vessels 30, 32, and 34 are next warmed up slowly, so that solid $B_2F_4$ vaporizes and flows into the $B_2F_4$ collection vessel(s) leaving the majority of $B_xF_y$ compounds inside the traps. The $B_2F_4$ collection vessels in the vessel array may be serially or concurrently filled with $B_2F_4$ extracted from the trap system. The purity of $B_2F_4$ condensed in the traps can be optimized by varying trap temperature, reactor pressure and line design, e.g., tube diameter, trap aspect ratio etc., however, purities greater than 90% are routinely achieved.

Subsequently, the traps containing the $B_xF_y$ compounds may be further warmed to recover such compounds, which may then be recycled, further processed, or submitted to other disposition or use.

Alternatively, an additional trap system can be installed inline of the gas mixture evaporating from the reactor, and cooled to temperature optimal for preferential capture of BxFy.

The 90%+ purity $B_2F_4$ subsequently is purified to higher purity, by processing in the apparatus of FIG. 5. The $B_2F_4$ collection vessels once filled with the 90%+ purity $B_2F_4$ are removed from the collection manifold in the FIG. 4 system, and are cooled and maintained at temperature at which the ratio of saturated vapor pressures of $BF_3$ and $B_2F_4$ is optimal for effective selective removal of $BF_3$.

FIG. 5 shows an illustrative $B_2F_4$ collection vessel 54 in the cold bath chamber 52. The cold bath chamber 52 can be filled with cryogen, or otherwise cooled to maintain the temperature of the $B_2F_4$ collection vessel at an appropriate level at which the $B_2F_4$ concentration is reduced to allow preferential removal of $BF_3$. The valve in the valve head assembly 55 of vessel 54 then is opened, and the $BF_3$ enriched gas mixture is flowed through discharge line 56, and through flow control valve 60 to the series of vessels in trap chambers 70, 72, and 74. The trap chambers contain a refrigerant or are otherwise cooled to maintain temperature of the vessels therein at levels that are suitable for preferential recapturing of $B_2F_4$ removed along with $BF_3$ from the collection vessel, with trap chamber 70 containing vessels 64 and 66, trap chamber 72 containing vessels 76 and 78, and trap chamber 74 containing vessels 80 and 82. The respective vessels are interconnected in a manifolded arrangement by manifold block 86, with flow circuitry connecting the respective vessels in the trap chambers.

The small amount of $BF_3$ in the 90%+ $B_2F_4$-containing gas mixture is captured by flow through the respective traps and manifold block 86 flow circuitry in line 88 (containing flow control valves 90 and 92), finally passing to the $BF_3$ capture vessel 96 in cold bath chamber 98, with the valve in valve head 94 of vessel 96 being open for such purpose. The cold bath chamber contains a refrigerant or is otherwise cooled so that the temperature of the $BF_3$ capture vessel 96 is maintained at a level that is optimal for $BF_3$ condensation.

The system next is isolated and the respective vessels are closed, following which the $B_2F_4$ collection vessels are warmed up to room temperature.

The foregoing cycle thereafter repeated until the desired purity of $B_2F_4$ is achieved. The purity of the recovered $B_2F_4$ for such purpose can be analyzed by any suitable analytical technique or instruments, such as an FT-IR analyzer. By the FIG. 5 process system, the purity of the 90%+ $B_2F_4$ gas can be increased to 99%+.

In another embodiment, the final product can be utilized as a precursor to generate an ion implantation species, e.g., for use in a beamline ion implanter or a plasma immersion ion implantation system. Plasma immersion ion implantation is sometimes referred to as PLAD or Piii. Such ion implantation species can be implanted in a substrate. Plasma implant systems do not use a mass analyzer to select a specific isotope, and they implant all isotopes that are generated in the plasma.

Plasma implant systems can derive benefit by controlled distribution of isotopic species, by use of precursors isotopically enriched in boron or other precursor species. By control of the distribution of isotopes deriving from precursor materials, enhanced repeatability and process control improvement can be realized. Plasma implantation processes may also derive benefit from the enhanced dissociative ability of diboron tetrafluoride in relation to boron trifluoride. Accordingly, isotopically enriched diboron tetrafluoride may afford significant operational advantages in various embodiments in which it is used.

Another aspect of the disclosure relates to a method for preventing instantaneous decomposition of heavy boron fluorides in $B_2F_4$ production, when $B_2F_4$ is produced by a two-stage reaction scheme

$$BF_3 + B \rightarrow BF \text{ (high temperature)} \quad (1)$$

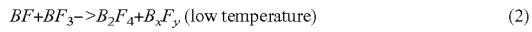

$$BF + BF_3 \rightarrow B_2F_4 + B_xF_y \text{ (low temperature)} \quad (2)$$

wherein reaction (1) is carried out at high temperature by flowing boron trifluoride ($BF_3$) through a bed of elemental boron solids, with $BF_3$ being in large excess stoichiometrically, in order to shift the reaction toward production of boron monofluoride (BF) and to provide enough $BF_3$ for reaction (2), wherein reaction (2) is conducted at low, e.g., cryogenic, temperature, to produce, in addition to $B_2F_4$, heavy boron fluorides of the general formula $B_xF_y$ as byproducts. The $B_xF_y$ byproducts can for example include $B_3F_5$ and $B_8F_{12}$, as well as compounds in which x>8 and y has any appropriate stoichiometric value for the composition involved.

It is known that $B_3F_5$ is unstable above −50° C., and that at temperatures >−20° C. decomposition of $B_3F_5$ can be vigorous. $B_8F_{12}$ decomposes as well, but its breakdown is less energetic. Other $B_xF_y$ compositions undergo slow decomposition into lighter boron fluorides such as $B_2F_4$ and $BF_3$, and heavier polymeric $B_xF_y$ compositions, and finally into boron metal.

$B_2F_4$ production in accordance with the present disclosure can be carried out in a batch process mode, with reactions (1) and (2) being carried out simultaneously in different parts of a same reactor. At the conclusion of the batch process, the reaction products and unreacted $BF_3$ are removed from the reactor and further processed to separate $B_2F_4$. Partial separation of $BF_3$ can be carried out during product extraction by a trap-to-trap method that involves passing the reaction product stream containing $B_2F_4$ and $BF_3$ through a series of vessels cooled at different temperatures, to capture and separate $B_2F_4$ from $BF_3$. Depending on the design of the assembly of series-coupled vessels, $B_xF_y$ can be accumulated in the same capture vessels as $B_2F_4$, or in different vessels. Further processing comprises warming of the capture vessels to allow evaporation of $B_2F_4$ and subsequent recapture thereof in a temporary vessel for further processing.

Figure 6:
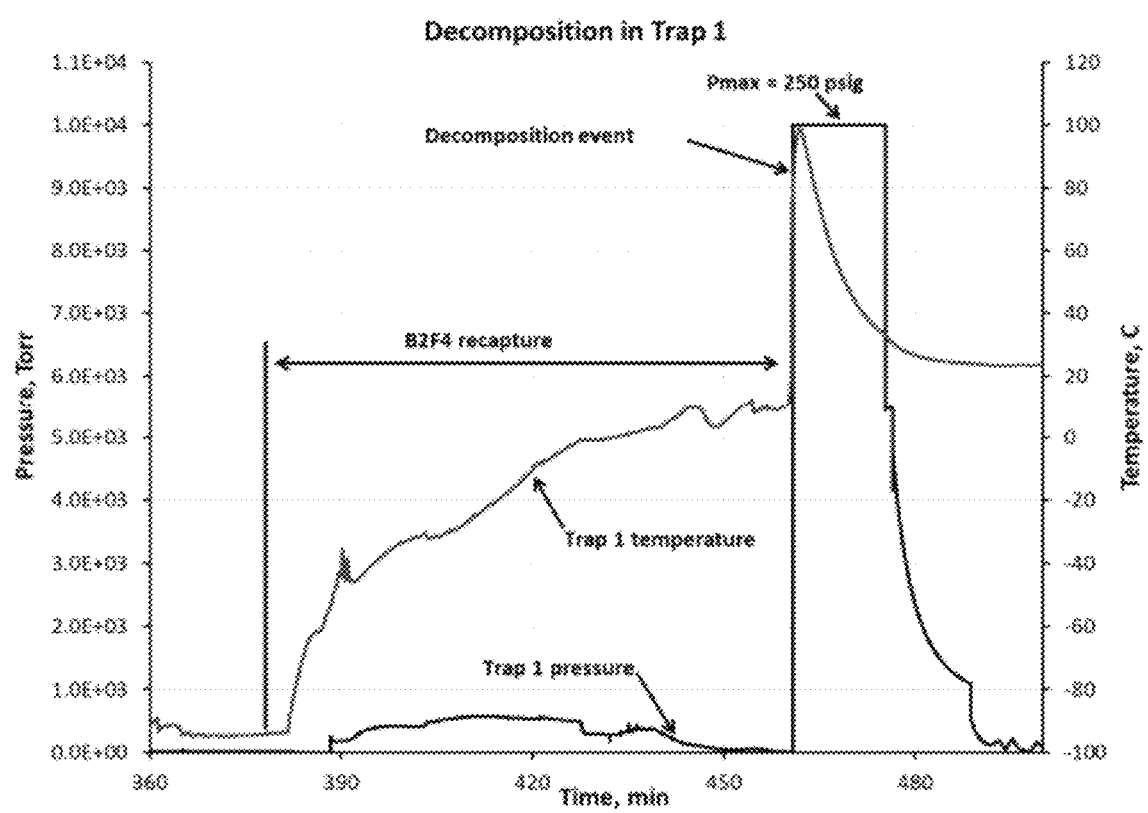
FIG. 6 is a graph of temperature, in degrees Centigrade, and pressure, in torr, as a function of time, in minutes, showing the temperature and pressure excursions that can occur during warming of a vessel containing large quantities of freshly captured $B_xF_y$.

During warming of a vessel with large quantities of freshly captured $B_xF_y$, instantaneous pressure and temperature excursions can occur upon reaching a certain temperature, as shown in FIG. 6. Analysis of the gas and solid products of such excursion indicates that $BF_3$ is the predominant gas product, and black powder comprising elemental boron is a solid product.

Such instantaneous decompositions of $B_xF_y$ are problematic, since the accompanying pressure and temperature spikes can damage pressure-sensitive equipment and/or even result in gas release. Further, the elemental boron that is formed is transported throughout the process system and can result in line clogging and damage to process system components that are sensitive to particulates. Still further, energetic decompositions of $B_xF_y$ can trigger decomposition and loss of the intended product $B_2F_4$.

Figure 7:
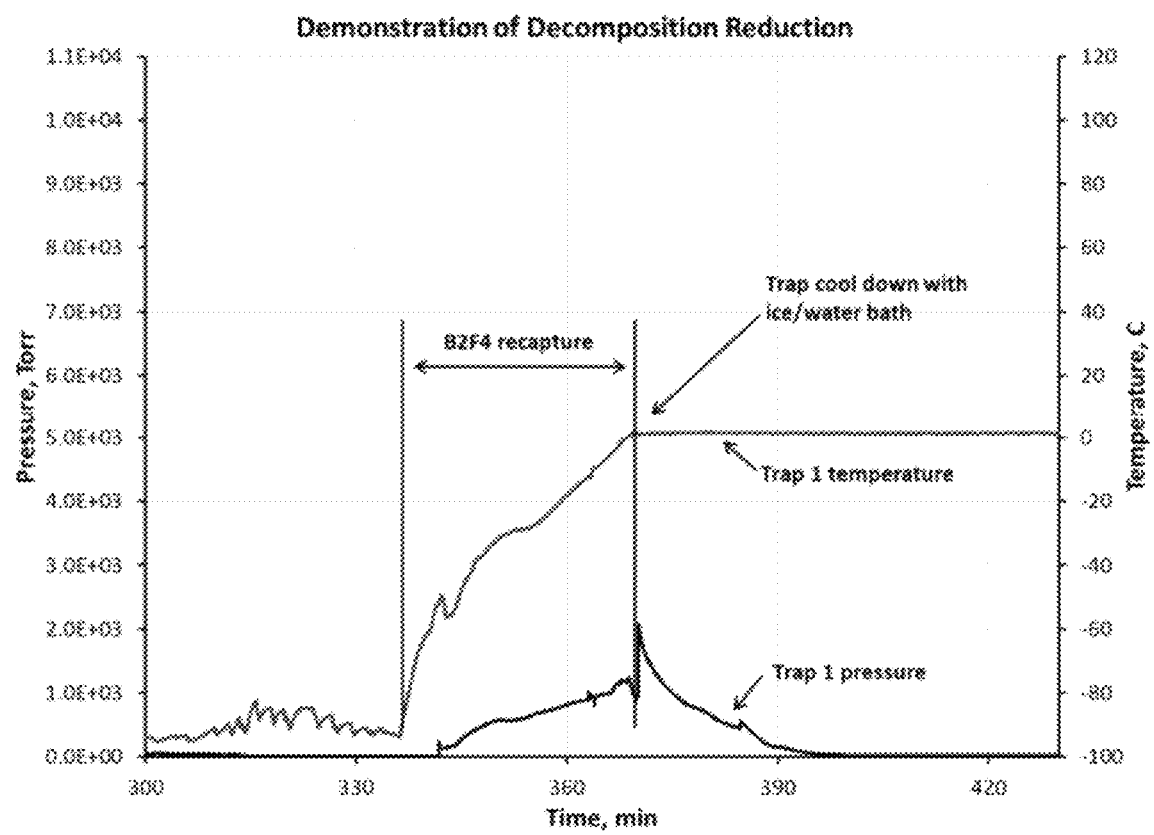
FIG. 7 is a graph of temperature, in degrees Centigrade, and pressure, in torr, as a function of time, in minutes, showing the effectiveness of controlled warming of a vessel containing large quantities of freshly captured $B_xF_y$, in suppressing temperature and pressure excursions of the type shown in the graph of FIG. 6.

The present disclosure contemplates a method of preventing or at least significantly reducing the incidence and rate of instantaneous decomposition of $B_xF_y$, by controlling the warming rate of the vessel containing $B_xF_y$. In one embodiment, the temperature of the vessel containing $B_xF_y$ is allowed to rise to 0-2° C. and then the vessel is immersed into a water bath containing ice. Results of such controlled warming are shown in FIG. 7. As shown in such figure, the temperature spike observed during uncontrolled warming is eliminated and the pressure rise is substantially reduced. In other tests of the same system, no pressure rise was observed. The vessel in such controlled warming process advantageously is kept in the water bath overnight, to allow very slow warming up to temperature of +10° C. to +20° C., after which the vessel is used for another cycle of $B_2F_4$ separation.

Thus, controlled warming results in much slower decomposition of more unstable heavy boron fluorides, without initiating decomposition of the entire inventory of $B_xF_y$ in the vessel. Inspection and testing of equipment used in process systems in which controlled warming is carried out has confirmed that significant reduction in the generation of particulates was achieved by controlled warming. The low levels of particulate generation during controlled warming correspondingly reduce the probability of clogging in the process system. Specifically, valve damage due to solids generation can be reduced from levels of 40-60% to 7-15% percent and in some case to zero.

Accordingly, the disclosure contemplates a method of forming a final product as a reaction product of an intermediate product and a reactant gas, wherein the intermediate product is a gaseous reaction product of the reactant gas and a reactive solid. Such method comprises conducting a reaction of the reactant gas and reactive solid in a first reaction zone, and a reaction of the reactant gas and intermediate product in a second reaction zone, wherein the reaction of the reactant gas and reactive solid in the first reaction zone is reversible. The method further comprises recovering the final product from a reaction mixture generated by the reaction of the reactant gas and intermediate product in the second reaction zone, e.g., including cryogenic distillation and/or trap-to-trap recovery of the final product. In such method, the reaction of the reactant gas and intermediate product in the second reaction zone forms boron fluorides of the formula $B_xF_y$, wherein x>2 and y has any stoichiometric value consistent with x. The method comprises recovery or removal of the boron fluorides of the formula $B_xF_y$ without mediating instantaneous decomposition thereof, e.g., by warming thereof to temperature in a range of from 0° C. to 2° C., followed by slow warming up to temperature in a range of from 10° C. to 20° C.

As used in such context, the term "slow warming up to temperature in a range of from 10° C. to 20° C." means that temperature increase, from initial temperature in a range of from 0° C. to 2° C., up to temperature in a range of from 10° C. to 20° C., is carried out over a period of at least six hours of substantially progressive increase of temperature.

The disclosure correspondingly contemplates a method of suppressing instantaneous decomposition of cryogenic temperature boron fluorides of the formula $B_xF_y$, wherein x>2 and y has any stoichiometric value consistent with x, during equilibration to ambient temperature, said method comprising warming of the cryogenic temperature boron fluorides to temperature in a range of from 0° C. to 2° C., followed by slow warming up to temperature in a range of from 10° C. to 20° C.

While the apparatus and method have been described with respect to various aspects, implementations and embodiments, it will be appreciated that any of such aspects, implementations and embodiments can be present in any combination with any other aspects, implementations and embodiments of the disclosure. The disclosure therefore is to be regarded as comprehending all permutations and combinations of compatible features individually or specifically described, in corresponding aggregations of such features. It further is to be recognized that any one or more of the individual features specifically disclosed herein may be selectively excluded from any other feature or combination of features disclosed herein, in specific implementations of the apparatus and method of the present disclosure, as further embodiments thereof.

Thus, the disclosure has been has been set out herein in reference to specific aspects, features and illustrative embodiments, it will be appreciated that the apparatus and methods disclosed herein are not thus limited, but rather extends to and encompasses numerous other variations, modifications and alternative embodiments, as will suggest themselves to those of ordinary skill in the field of the present disclosure, based on the description herein. Correspondingly, the invention as hereinafter claimed is intended to be broadly construed and interpreted, as including all such variations, modifications and alternative embodiments, within its spirit and scope.

What is claimed is:

1. An apparatus, comprising:
a reaction cavity having a casing disposed therein holding elemental boron solids, said reaction cavity coupled with a source of gaseous $BF_3$, and configured for contacting the gaseous $BF_3$ with the elemental boron solids for reaction thereof under temperature and pressure conditions effective to form BF as an intermediate species; and
openings for allowing an unreacted portion of the gaseous $BF_3$ and the intermediate species BF to exit the reaction cavity, said openings comprising a plurality of openings formed along a surface of the casing.

2. The apparatus of claim 1, further comprising a process control system that is arranged to effect said temperature and pressure conditions in the reaction cavity, wherein the process control system is constructed and arranged to establish and maintain (i) temperature in the reaction cavity in a range of from 1000° C. to 2200° C., (ii) pressure in the reaction cavity in a range of from 0.1 torr to 10 torr, and (iii) a flow rate of gaseous $BF_3$ through the reaction cavity in a range of from 500 standard cubic centimeters per minute to 1200 standard cubic centimeters per minute.

3. The apparatus of claim 1, further comprising a cold trap configured to receive gaseous $BF_3$ and BF from the reaction cavity, and effect condensation and reaction of said gaseous $BF_3$ and BF to form $B_2F_4$.

4. The apparatus of claim 3, wherein (a) the $BF_3$ comprises $BF_3$ that is isotopically-enriched above natural abundance in $^{10}B$ or $^{11}B$, and/or the elemental boron solids comprise boron metal that is isotopically-enriched above natural abundance in $^{10}B$ or $^{11}B$.

5. The apparatus of claim 1, wherein the reaction cavity is formed of a material comprising graphite, and the apparatus comprises a gas flow passage for flow of the gaseous $BF_3$ to the reaction cavity.

6. The apparatus of claim 1, further comprising a cryogenically cooled region that is configured to effect reaction between said gaseous $BF_3$ and BF to form $B_2F_4$.

7. The apparatus of claim 6, wherein the apparatus comprises a process control system that is arranged to effect selected temperature and pressure conditions in the cryogenically cooled region, wherein the selected pressure conditions include pressure in a vacuum pressure range, and wherein the cryogenically cooled region is configured to effect said reaction between said gaseous $BF_3$ and BF to form $B_2F_4$ at or on a surface of the cryogenically cooled region, so that the gaseous $BF_3$ and BF undergo a condensation reaction to form said $B_2F_4$.

8. The apparatus of claim 6, further comprising a passageway configured to flow additional gaseous $BF_3$ into the cryogenically cooled region to drive said reaction therein toward $B_2F_4$.

9. The apparatus of claim 6, wherein the cryogenically cooled region includes a recovery apparatus for recovering $B_2F_4$ from a reaction mixture produced in the reaction between said gaseous $BF_3$ and BF, and the recovery apparatus includes a cryogenic distillation apparatus or a cold trap.

10. The apparatus of claim 9, wherein the recovery apparatus is configured to produce recovered $B_2F_4$ having a purity greater than 90%.

11. The apparatus of claim 1, wherein the plurality of openings have size that is variable along a predetermined direction, wherein the size of openings increases along the predetermined direction, or wherein the size of openings decreases along the predetermined direction.

12. The apparatus of claim 1, wherein the casing comprises a retention structure that supports the boron solids.

13. The apparatus of claim 1, wherein the inner diameter of the reaction cavity is larger than the diameter of the casing such that the reaction cavity is in spaced relationship to the casing.

14. The apparatus of claim 13, wherein the reaction cavity and casing are arranged coaxially with respect to each other, forming an annular space therebetween.

15. The apparatus of claim 14, wherein the reaction cavity is in the form of a hollow cylinder.

16. A method of forming $B_2F_4$ as a reaction product of an intermediate species comprising BF and a gaseous reagent comprising $BF_3$, wherein the intermediate species is a gaseous reaction product of the gaseous reagent and a solid elemental boron material, said method comprising providing an apparatus according to claim 1, conducting a reaction of the gaseous reagent and solid elemental boron material in the reaction region of said apparatus, as a first reaction zone, and conducting a reaction of the unreacted portion of the gaseous reagent and intermediate species after their exit from the reaction region, in a second reaction zone to yield said $B_2F_4$, wherein the reaction of the gaseous reagent and solid elemental boron material in the first reaction zone is reversible.

17. The method of claim 16, wherein the first reaction zone is operated at temperature in a range of from 1000° C. to 2200° C., pressure in a range of from 0.1 torr to 10 torr, and flow rate of the gaseous reagent through the reaction region in a range of from 500 standard cubic centimeters per minute to 1200 standard cubic centimeters per minute, and the second reaction zone is operated at cryogenic temperature.

18. The method of claim 16, wherein at least one of the gaseous reagent and solid elemental boron material comprises a boron-containing material that is isotopically enriched beyond natural abundance in one of $^{10}B$ and $^{11}B$.

19. The method of claim 16, wherein said $B_2F_4$ is utilized as a precursor to generate an ion implantation species.

20. The method of claim 16, further comprising recovering the $B_2F_4$ from a reaction mixture generated by the reaction of the gaseous reagent and intermediate species in the second reaction zone, by cryogenic distillation and/or trap-to-trap recovery of the $B_2F_4$.

21. The method of claim 20, wherein the reaction of the gaseous reagent and intermediate species in the second reaction zone forms boron fluorides of the formula $B_xF_y$, wherein x>2 and y has any stoichiometric value consistent with x, and the method comprises recovery or removal of the boron fluorides of the formula $B_xF_y$, without mediating instantaneous decomposition thereof.

22. The method of claim 21, wherein the recovery or removal of the boron fluorides of the formula $B_xF_y$ without mediating instantaneous decomposition thereof, comprises controlled warming thereof in a temperature progression that is effective for preventing rapid decomposition of $B_xF_y$.

23. The method of claim 1, wherein the temperature progression comprises warming to temperature in a range of from 0° C. to 2° C., followed by slow warming up to temperature in a range of from 10° C. to 20° C.

* * * * *

UNITED STATES PATENT AND TRADEMARK OFFICE
CERTIFICATE OF CORRECTION

| | | |
|---|---|---|
| PATENT NO. | : 9,205,392 B2 | Page 1 of 1 |
| APPLICATION NO. | : 13/219706 | |
| DATED | : December 8, 2015 | |
| INVENTOR(S) | : Byl et al. | |

It is certified that error appears in the above-identified patent and that said Letters Patent is hereby corrected as shown below:

In the claims

Column 22, line 13: "claim 1" should read -- claim 22 --.

Signed and Sealed this
Twenty-fourth Day of May, 2016

Michelle K. Lee
*Director of the United States Patent and Trademark Office*